United States Patent
Hu et al.

(10) Patent No.: US 8,030,937 B2
(45) Date of Patent: *Oct. 4, 2011

(54) MULTIPLE FREQUENCY BASED LEAKAGE CORRECTION FOR IMAGING IN OIL BASED MUDS

(75) Inventors: Guoyu (David) Hu, Houston, TX (US); Michael S. Bittar, Houston, TX (US); William J. Schaecher, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 509 days.

This patent is subject to a terminal disclaimer.

(21) Appl. No.: 12/088,061

(22) PCT Filed: Dec. 11, 2006

(86) PCT No.: PCT/US2006/061860
§ 371 (c)(1),
(2), (4) Date: Mar. 25, 2008

(87) PCT Pub. No.: WO2007/070777
PCT Pub. Date: Jun. 21, 2007

(65) Prior Publication Data
US 2008/0252296 A1    Oct. 16, 2008

Related U.S. Application Data

(60) Provisional application No. 60/749,765, filed on Dec. 13, 2005.

(51) Int. Cl.
*G01V 3/20* (2006.01)
*G01V 3/24* (2006.01)

(52) U.S. Cl. ...................... 324/366; 324/370
(58) Field of Classification Search ............. 324/347, 324/354–358, 363–364, 366–367, 370–371, 324/373–375; 702/6–7, 11; 175/50
See application file for complete search history.

(56) References Cited

U.S. PATENT DOCUMENTS
3,086,195 A    4/1963    Halliday
(Continued)

FOREIGN PATENT DOCUMENTS
EP    105801    4/1984
(Continued)

OTHER PUBLICATIONS

"AU First Examiner's Report", dated Aug. 7, 2009, Appl No. 2006311719, "Permittivity Measurements with Oil-Based Mud Imaging Tool", filed Nov. 6, 2006, 2 pgs.

(Continued)

*Primary Examiner* — Bot Ledynh
(74) *Attorney, Agent, or Firm* — Krueger Iselin LLP

(57) ABSTRACT

Oil-based mud imaging systems and methods having leakage current compensation. In some embodiments, disclosed logging systems include a logging tool in communication with surface computing facilities. The logging tool is provided with a sensor array having at least two voltage electrodes positioned between at least two current electrodes that create an electric field in a borehole wall, and is further provided with electronics coupled to the current electrodes to determine a differential voltage between the voltage electrodes in response to different current frequencies from the current electrodes. From the voltage measurements at different frequencies, the computing facilities determine borehole wall resistivity as a function of depth and azimuth, and may display the resistivity as a borehole wall image.

18 Claims, 4 Drawing Sheets

U.S. PATENT DOCUMENTS

| | | | |
|---|---|---|---|
| 3,305,771 A | 2/1967 | Arps |
| 3,462,678 A | 8/1969 | Eaton |
| 3,470,457 A | 9/1969 | Howlett |
| 3,973,181 A | 8/1976 | Calvert |
| 4,012,952 A | 3/1977 | Dory |
| 4,072,923 A | 2/1978 | Siems et al. |
| 4,241,611 A | 12/1980 | Specht et al. |
| 4,361,808 A | 11/1982 | Kern et al. |
| 4,468,623 A | 8/1984 | Gianzero et al. |
| 4,532,615 A | 7/1985 | Ballinger |
| 4,567,759 A | 2/1986 | Ekstrom et al. |
| 4,677,367 A | 6/1987 | Goodman |
| 4,692,707 A | 9/1987 | Locke et al. |
| 4,718,011 A | 1/1988 | Patterson |
| 5,044,462 A | 9/1991 | Maki |
| 5,144,126 A | 9/1992 | Perry et al. |
| 5,160,925 A | 11/1992 | Dailey et al. |
| 5,216,242 A | 6/1993 | Perry et al. |
| 5,235,285 A | 8/1993 | Clark et al. |
| 5,251,708 A | 10/1993 | Perry et al. |
| 5,278,550 A | 1/1994 | Rhein-Knudson et al. |
| 5,331,318 A | 7/1994 | Montgomery |
| 5,339,037 A | 8/1994 | Bonner |
| 5,359,180 A | 10/1994 | Park et al. |
| 5,396,175 A | 3/1995 | Seeman |
| 5,570,024 A | 10/1996 | Vail et al. |
| 5,596,534 A | 1/1997 | Manning |
| 5,691,712 A | 11/1997 | Meek et al. |
| 5,992,223 A | 11/1999 | Sabins et al. |
| 6,023,168 A | 2/2000 | Minerbo |
| 6,173,793 B1 | 1/2001 | Thompson et al. |
| 6,191,588 B1 | 2/2001 | Chen |
| 6,252,518 B1 | 6/2001 | Laborde |
| 6,268,726 B1 | 7/2001 | Prammer et al. |
| 6,332,109 B1 | 12/2001 | Sheard et al. |
| 6,348,796 B2 | 2/2002 | Evans et al. |
| 6,362,619 B2 | 3/2002 | Prammer et al. |
| 6,373,254 B1 | 4/2002 | Dion et al. |
| 6,396,276 B1 | 5/2002 | Van Steenwyk et al. |
| 6,518,756 B1 | 2/2003 | Morys et al. |
| 6,564,883 B2 | 5/2003 | Fredericks et al. |
| 6,583,621 B2 | 6/2003 | Prammer et al. |
| 6,600,321 B2 | 7/2003 | Evans |
| 6,603,314 B1 | 8/2003 | Kostelnicek et al. |
| 6,626,251 B1 | 9/2003 | Sullivan et al. |
| 6,636,406 B1 | 10/2003 | Anthony |
| 6,688,396 B2 | 2/2004 | Floerke et al. |
| 6,714,014 B2 | 3/2004 | Evans et al. |
| 6,717,501 B2 | 4/2004 | Hall et al. |
| 6,809,521 B2 | 10/2004 | Tabarovsky et al. |
| 6,815,930 B2 | 11/2004 | Goodman |
| 6,825,659 B2 | 11/2004 | Prammer et al. |
| 6,850,068 B2 | 2/2005 | Chemali et al. |
| 6,891,377 B2 | 5/2005 | Cheung et al. |
| 6,975,112 B2 | 12/2005 | Morys et al. |
| 7,109,719 B2 | 9/2006 | Fabris et al. |
| 7,119,544 B2 | 10/2006 | Hayman et al. |
| 7,139,218 B2 | 11/2006 | Hall et al. |
| 7,145,472 B2 | 12/2006 | Lilly et al. |
| 7,154,412 B2 | 12/2006 | Dodge et al. |
| 7,207,396 B2 | 4/2007 | Hall et al. |
| 7,242,194 B2 | 7/2007 | Hayman et al. |
| 7,463,027 B2 | 12/2008 | Prammer et al. |
| 7,579,841 B2 | 8/2009 | San Martin et al. |
| 7,696,756 B2 | 4/2010 | Morys et al. |
| 7,733,086 B2 | 6/2010 | Prammer et al. |
| 7,888,941 B2 | 2/2011 | San Martin et al. |
| 2002/0043369 A1 | 4/2002 | Vinegar et al. |
| 2002/0153897 A1 | 10/2002 | Evans et al. |
| 2003/0155925 A1 | 8/2003 | Tabarovsky et al. |
| 2003/0173968 A1 | 9/2003 | Cheung et al. |
| 2003/0222651 A1 | 12/2003 | Tabanou |
| 2004/0124837 A1 | 7/2004 | Prammer et al. |
| 2004/0245991 A1 | 12/2004 | Hayman et al. |
| 2005/0067190 A1 | 3/2005 | Tabanou |
| 2005/0133262 A1* | 6/2005 | Chen et al. ............. 175/40 |
| 2005/0179437 A1 | 8/2005 | Hayman et al. |
| 2007/0046291 A1 | 3/2007 | Itskovich |
| 2007/0103161 A1 | 5/2007 | San Martin et al. |
| 2009/0309591 A1 | 12/2009 | Goodman et al. |

FOREIGN PATENT DOCUMENTS

| | | |
|---|---|---|
| EP | 1035299 | 9/2000 |
| GB | 2289340 | 11/1995 |
| GB | 2391070 | 1/2004 |
| GB | 2401185 | 3/2004 |
| WO | WO2005/059285 | 6/2005 |

OTHER PUBLICATIONS

"AU First Examiner's Report", dated Dec. 18, 2008, Appl No. 2006262325, High Frequency or Multifrequency Resistivity Tool, filed Dec. 19, 2007, 2 pgs.

"DE Office Action", dated Jan. 27, 2010, Application No. 112006002282.2, Standoff Compensation for Imaging in Oil-Based Muds, filed Sep. 4, 2007, 15 pgs.

"German Office Action", dated Mar. 9, 2010, Appl No. 112006002951.7, "Permittivity Measurements with Oil-Based Mud Imaging Tool", filed Apr. 30, 2008, 7 pgs.

"PCT International Preliminary Report on Patentability", dated May 15, 2008, Appl No. PCT/US06/034745, "Standoff Compensation for Imaging in Oil-Based Muds", filed Sep. 7, 2006, 6 pgs.

"PCT International Preliminary Report on Patentability", dated May 22, 2008, Appl No. PCT/US06/060795, "Oil Based Mud Imaging Tool with Common Mode Voltage Compensation", filed Nov. 10, 2006 6 pgs.

"PCT International Preliminary Report on Patentability", dated Jun. 18, 2008, Appl No. PCT/US06/061860, Multiple Frequency Based Leakage Correction for Imaging in Oil Based Muds, 1 pg.

"PCT International Search Report and Written Opinion", dated Jan. 18, 2007, Appl No. PCT/06/24056, "High Frequency or Multifrequency Resistivity Tool", filed Jun. 20, 2006, 12 pgs.

"PCT International Search Report and Written Opinion", dated Mar. 12, 2008, Appl No. PCT/US06/60774, "Displaced Electrode Amplifier", filed Nov. 10, 2006, 10 pgs.

"PCT International Search Report and Written Opinion", dated Dec. 5, 2007, Appl No. PCT/us06/43244, Permittivity Measurements with Oil-Based Mud Imaging Tool, filed Nov. 6, 2006, 8 pgs.

"PCT International Search Report", dated Apr. 30, 2008, Appl No. PCT/US06/61860, "Multiple Frequency Based Leakage Correction for Imaging in Oil Based Muds", filed Dec. 11, 2006, 3 pgs.

"PCT International Written Opinion", dated Apr. 30, 2008, Appl No. PCT/US06/61860, "Multiple Frequency Based Leakage Correction for Imaging in Oil Based Muds", filed Dec. 11, 2006, 4 pgs.

"PCT Internat'l Preliminary Report on Patentability", dated Mar. 26, 2009, Appl No. PCT/US06/34959, "Displaced Electrode Amplifier", filed Sep. 8, 2006, 2 pgs.

"PCT Internat'l Preliminary Report on Patentability", dated Jul. 17, 2008, Appl No. PCT/US06/60774, "Displaced Electrode Amplifier", filed Nov. 10, 2006, 2 pgs.

"PCT Internat'l Search Report and Written Opinion", dated May 2, 2007, Appl No. PCT/US06/34738, "Oil Based Mud Imaging Tool with Common Mode Voltage Compensation", filed Sep. 7, 2006, 10 pgs.

"PCT Internat'l Search Report and Written Opinion", dated Jul. 11, 2008, Appl No. PCT/us06/34959, "Displaced Electrode Amplifier", filed Sep. 8, 2006, 5 pgs.

"PCT Internat'l Search Report and Written Opinion", dated Sep. 26, 2007, Appl No. PCT/US06/34745, "Standoff Compensation for Imaging in Oil-Based Muds", filed Sep. 7, 2006, 4 pgs.

"UK Examination Report", dated Feb. 25, 2010, Appl No. GB0723889.2, "Permittivity Measurements with Oil-Based Mud Imaging Tool", filed Nov. 6, 2006, 3 pgs.

"XE1203 TrueRF Datasheet", Xemics (2004).

Bonner, S. et al., "A New Generation of Electrode Resistivity Measurements for Formation Evaluation While Drilling", SPWLA 35th Annual Logging Symposium, (Jun. 19, 1994), pp. 1-19.

Brown, J. A., et al., "Design and Fabrication of Annular Arrays for High Frequency Ultrasound", IEEE Transactions on Ultrasonics, Ferroelectrics, and Frequency Control, vol. 51, No. 8, Aug. 2004. 8 pgs.

Davis, Leroy "CAN Bus", Leroy's Engineering Website, www.interfacebus.com/Design_Connector_CAN.html, (2004), 7 pgs.

Franklin, Curt "How DSL Works", How Stuff Works, http://computer.howstuffworks.com/dsl.htm., (2004), 5 pgs.

Goodman, George D., et al., "Displaced Electrode Amplifier", PCT Appl No. PCT/US06/60774, filed Nov. 10, 2006, 20 pgs.

Morys, Marian et al., "Field Testing of an Advanced LWD Imager for Oil-Based Mud Applications", SPWLA 51st Annual Logging Symposium, Jun. 19-23, 2010, pp. 1-13.

Morys, Marian L., et al., "Oil Based Mud Imaging Tool with Common Mode Voltage Compensation", PCT Appl No. PCT/US06/34738, filed Sep. 7, 2006, 17 pgs.

Piezo Technologies, "Piezo Technologies Material Properties 2010", 2010 PiezoTech, LLC, http://www.PiezoTechnologies.com/pdf/keramos-material-specs.pdf, revised Sep. 2010, 1 pg.

Ritter, Rene N., et al., "High Resolution Visualization of Near Wellbore Geology Using While-Drilling Electrical images", SPWLA 45th Annual Logging Symposium, The Netherlands, Jun. 6-9, 2004, pp. 1-13.

* cited by examiner

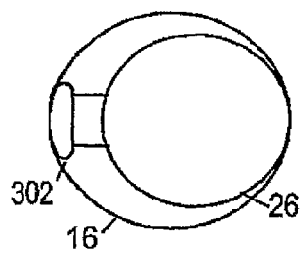
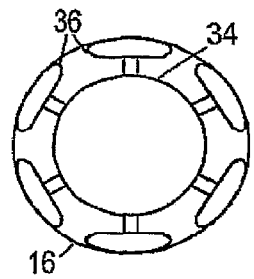
FIG. 3     FIG. 4
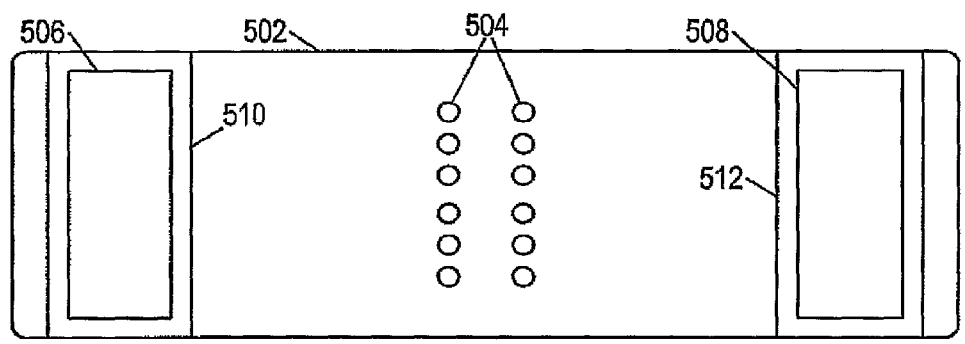
FIG. 5
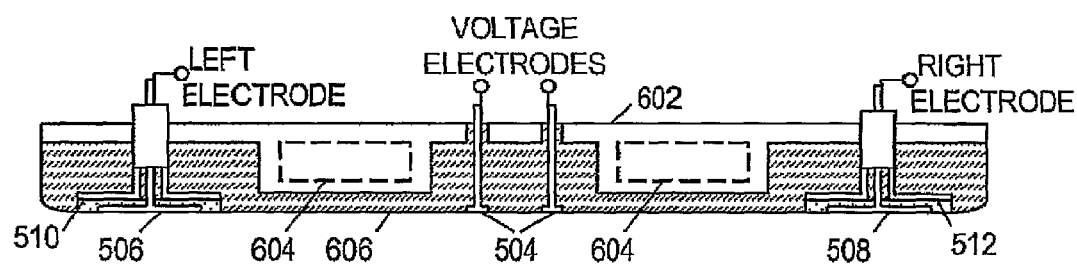
FIG. 6

MULTIPLE FREQUENCY BASED LEAKAGE CORRECTION FOR IMAGING IN OIL BASED MUDS

RELATED APPLICATIONS

The present application claims priority to U.S. Provisional Patent Application 60/749,765, filed Dec. 13, 2005 and entitled "Multiple Frequency Based Leakage Current Correction For Imaging In Oil-Based Muds", which is hereby incorporated herein by reference.

BACKGROUND

Modern oil field operations demand a great quantity of information relating to the parameters and conditions encountered downhole. Because drillers and operators are forced to operate remotely from the underground formations and reservoirs they wish to exploit, their access to relevant information is limited. Consequently, there is a demand for tools that provide new types of information, more accurate information, or more efficient collection of information. Examples of the information that may be collected include characteristics of the earth formations traversed by the borehole, and data relating to the size and configuration of the borehole itself. This information is usually recorded and displayed in the form of a log, i.e. a graph of the measured parameter as a function of tool position or depth. The collection of information relating to conditions downhole, which commonly is referred to as "logging", can be performed by several methods including wireline logging and "logging while drilling" (LWD).

In wireline logging, a probe or "sonde" is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated, thereby enabling measurements of the formation while it is less affected by fluid invasion. While LWD measurements are desirable, drilling operations create an environment that is generally hostile to electronic instrumentation, telemetry, and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure borehole surface resistivity on a fine scale. The resistivity measurements can be converted into pixel intensity values to obtain a borehole wall image. However, oil-based muds can inhibit such measurements due to the high resistivity of the mud and the variability of the contact impedance due to variable standoff. U.S. Pat. No. 6,191,588 (Chen) discloses an imaging tool for use in oil-based muds. Chen's resistivity tool employs at least two pairs of voltage electrodes positioned on a non-conductive surface between a current source electrode and a current return electrode. At least in theory, the separation of voltage and current electrodes eliminates the oil-based mud's effect on voltage electrode measurements, enabling at least qualitative measurements of formation resistivity.

In constructing an imaging tool for use in oil-based muds, certain engineering constraints on the structural strength of sensor pads will be recognized. These engineering constraints may be met by making the sensor pad base out of a metal such as steel. Though the steel can be insulated to present a non-conductive external surface, the electrical conductivity of the base creates potential current leakage paths. These leakage paths adversely affect the tool's resistivity measurements.

BRIEF DESCRIPTION OF THE DRAWINGS

In the following detailed description, reference will be made to the accompanying drawings, in which:

FIG. 3 shows an illustrative first logging tool configuration;

FIG. 4 shows an illustrative second logging tool configuration;

FIG. 5 shows a front view of an illustrative sensor pad;

FIG. 6 shows a cross section of the illustrative sensor pad;

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

DETAILED DESCRIPTION

Disclosed herein are various leakage current compensation methods and systems for imaging in nonconductive fluids such as an oil-based mud. In some embodiments, disclosed logging systems include a logging tool in communication with surface computing facilities such as a personal computer, server, digital signal processing board, or some other form of computing circuit. The logging tool is provided with a sensor array having at least two voltage electrodes positioned between at least two current electrodes that create an electric field in a borehole wall, and is further provided with an electronic circuit to determine a differential voltage between the voltage electrodes in response to different source current frequencies from the current electrodes. The voltage measurements at different frequencies enable compensation for leakage current effects. From the voltage measurements at different frequencies, the computing facilities can determine compensated borehole wall resistivity as a function of depth and azimuth, and may display the resistivity as a borehole wall image.

Figure 1:
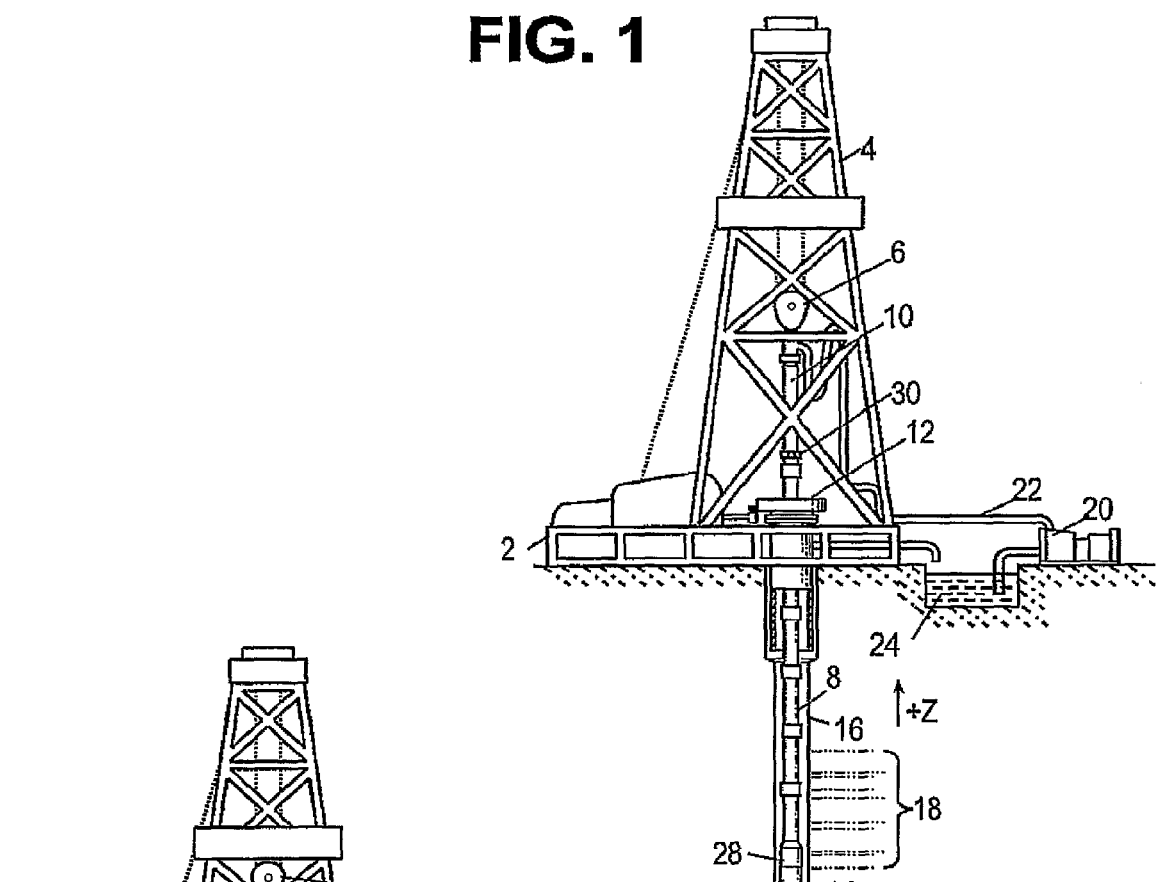
FIG. 1 shows an illustrative logging while drilling (LWD) environment.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

A LWD resistivity imaging tool 26 is integrated into the bottom-hole assembly near the bit 14. As the bit extends the borehole through the formations, tool 26 collects measurements relating to various formation properties as well as the tool orientation and various other drilling conditions. The resistivity imaging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface.

Figure 2:
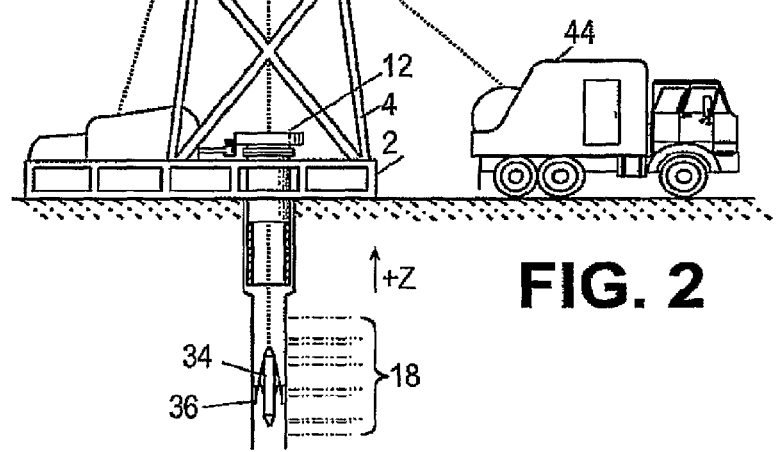
FIG. 2 shows an illustrative wireline logging environment.

At various times during the drilling process, the drill string 8 may be removed from the borehole as shown in FIG. 2. Once the drill string has been removed, logging operation can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

FIG. 3 shows a cross-sectional view of LWD resistivity imaging tool 26 in a borehole 16. A biasing mechanism 302 de-centralizes tool 26 to minimize the standoff between the tool's sensors and the borehole wall. The tool's sensors may be located in a pad on biasing mechanism 302, or alternatively the sensors may be located in the main body of the tool opposite the biasing mechanism. As the tool 26 rotates and progresses downhole at the drilling rate, the sensors will trace a helical path on the borehole wall. Orientation sensors within the tool may be used to associate the resistivity measurements with the sensors' positions on the borehole wall. Surface computing facilities may collect resistivity measurements, orientation (azimuth) measurements, and tool position measurements, and, may process the collected measurements to create a resistivity image of the borehole wall.

FIG. 4 shows a cross-sectional view of the wireline resistivity imaging tool 34 in a borehole 16. (Some LWD imaging tool embodiments may be constructed with a similar configuration.) Sensing pads 36 are deployed against the borehole wall to minimize standoff. Multiple pads may be used to obtain measurements over a greater fraction of the borehole's circumference. In some embodiments, the pads are provided in axially-offset groups to increase circumferential coverage without undue crowding in the undeployed configuration. In the logging scenarios described above with respect to FIGS. 1 and 2, the drilling fluid present in the borehole is an electrically nonconductive fluid such as an oil-based mud. Some of the fluid may mix with drill cuttings or material from the borehole walls to form a viscous semi-solid layer on the borehole walls. This layer is commonly termed "mudcake", and it prevents intimate contact between logging sensors and uncontaminated formation material. In addition, motion of the logging instruments may create a fluid flow layer that further separates the logging sensors from the uncontaminated formation materials.

The mudcake and fluid flow layers have a very low conductivity, which creates some difficulty for high-resolution measurements of borehole wall resistivity. The mudcake creates additional problems where low resistivity formations are measured, because the current flow into the formation may be relatively small and in turn generates an extremely small voltage difference that is difficult to measure. Measurements through the low-conductivity layers may be improved by: (1) using an alternating current; (2) separating the voltage electrodes in order to increase the signal (at the cost of degrading spatial resolution); and (3) using a source current with a higher operating frequency.

FIG. 5 shows the face of an illustrative sensor pad 502 having six pairs of voltage electrodes 504 positioned between current electrodes 506 and 508. In practice, the sensor; pads may be provided with additional voltage and current electrodes, and in fact may operate, on multiple axes. With uniaxial sensor pads such as pad 502, the length of the sensor pad is kept parallel to the long axis of tool 34. The distance between the current electrodes 506, 508; controls the depth of investigation, with greater distances providing greater depths of investigation. The distances between the voltage electrodes 504 controls the spatial resolution of the tool, with smaller distances providing higher resolutions. Behind each of the current electrodes 506, 508 is a corresponding conductive shield 510, 512, which may alternatively be termed a "guard electrode". The shields ("guard electrodes") may be maintained at the same potential as the corresponding current electrode so as to minimize any leakage currents from the current electrodes.

A cross-section of the illustrative sensor pad 502 is shown in FIG. 6. Sensor pad 502 comprises a metal substrate 602 to provide the pad with the needed rigidity and strength. The metal substrate 602 may include cavities 604 to hold sensor circuitry. For illustrative purposes, the electrode feeds are shown passing through the sensor pad 502, but the electrode feeds may alternatively connect to the sensor circuitry in cavities 604 or in a central cavity (not shown).

In some embodiments, metal substrate 602 comprises steel. The face of metal substrate 602 is covered with an insulating layer 606, which in some embodiments comprises a polyetheretherketone (PEEK) material. Current electrodes 506 and 508 are embedded on the face of the insulating layer 606. Shields 510 and 512 separate the current electrodes 506 and 508 from the body of pad 502, and the lines that feed current electrodes 506, 508 are preferably also shielded, possibly with the line shields in a coaxial cable or triaxial cable configuration. In some embodiments, shields are also provided for the voltage electrodes and voltage electrode feeds. Separating the current electrodes from the electrode shields are insulating inserts 608, which in some embodiments comprise a PEEK material.

Figure 7:
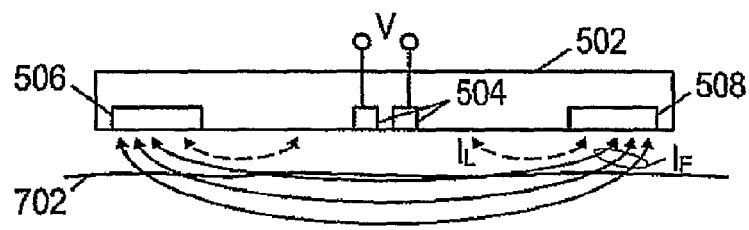
FIG. 7 shows an illustrative current flow environment.

At higher measurement frequencies, capacitive coupling to the metal substrate creates leakage currents. Such leakage currents can severely impair resistivity measurements. To enable measurements at such frequencies, the geometric design of the pad should be tailored to minimize capacitive coupling (e.g., by increasing the thickness of the insulating materials). Moreover the use of guard electrodes, particularly when combined with a current sensing design that excludes current flow from the guard electrodes, is particularly effective at minimizing the effects of current leakage. Nevertheless, some residual leakage currents may be expected FIG. 7 shows some of the current flows that may be associated with the illustrative sensor pad. As shown in FIG. 7, the current electrodes drive an electric field, generating current flow lines $I_F$ that penetrate a borehole wall 702. However, the conductive elements in sensor pad 502 also permit the formation of leakage current flow lines $I_L$ that couple the electrodes via the sensor pad body, bypassing the borehole wall. The density of these leakage current flow lines varies as a function of standoff and formation resistivity.

Figure 8:
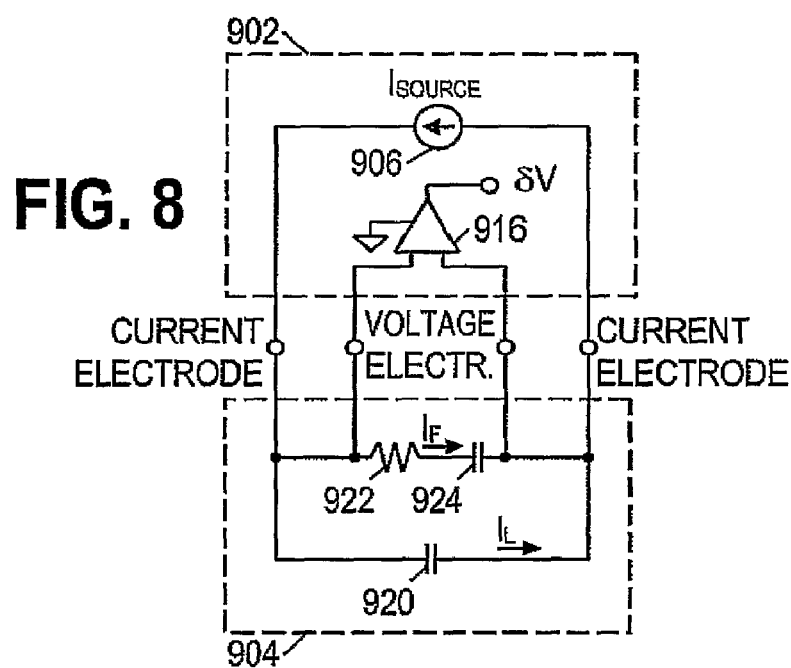
FIG. 8 shows an illustrative circuit model for the illustrative sensor pad.

FIG. 8 shows an illustrative circuit model for pad 502. Pad 502 comprises measurement circuitry 902 coupled to the voltage and current electrodes. The various electrodes in turn couple to the measurement environment that is modeled as an equivalent circuit 904. The equivalent circuit 904 is a simplified approximation of the borehole wall's electrical characteristics, and is provided here as an aid to understanding the disclosed compensation methods.

Measurement circuitry 902 comprises a current or voltage source 906 that drives an oscillating current between the current electrodes. A current sensor may be coupled to the current electrodes to measure total current flow between the electrodes. Measurement circuitry 902 further includes a detector 916 for each voltage electrode pair to measure the potential difference generated by the formation currents. Detector 916 may take the form of a differential voltage amplifier, and in alternative embodiments, may take the form of separate sense amplifiers for each voltage electrode. In both cases, circuitry 902 may include analog-to-digital converters to enable digital processing of the measured potential differences. These potential differences are associated with a position on the borehole wall and processed to estimate formation resistivity at that position.

Equivalent circuit 904 includes components 920-924 that approximate theoretical current paths between the current electrodes. Capacitor 920 represents a current path through the body of pad 502, whereas resistor 922 and capacitor 924 represent current paths passing through the formation. The current labeled $I_L$ flows through capacitor 920, and the current labeled $I_F$ flows through resistor 922 and capacitor 924. The total source current is $I_T=I_L+I_F$. More sophisticated equivalent circuit models are contemplated and may be used. Each equivalent circuit should include at least one component to represent formation impedance and at least one component to represent leakage impedance.

In equivalent circuit 904, the impedance of the two current paths varies differently as a function of frequency. It can be shown that $$\frac{1}{Z_T(\omega)} = \frac{I_T}{V(\omega)} = \frac{1}{Z_L(\omega)} + \frac{1}{Z_F(\omega)} = j\omega C_L + \frac{1}{R - j\frac{1}{\omega C_F}} \quad (1)$$

where R is the formation resistance (represented by resistor 922), $C_F$ is the formation capacitance (represented by capacitor 924), and $C_L$ is the leakage capacitance (represented by capacitor 920). Thus the equation for the total impedance has three unknowns. If the total impedance is measured at n frequencies and separated into real (in-phase) and imaginary (quadrature phase) components, there are 2n equations from which the unknowns can be determined.

For example, let the total impedances measured at two different frequencies be:

$$\frac{1}{Z_T(\omega_1)} = a_1 + jb_1 \quad (2)$$

$$\frac{1}{Z_T(\omega_2)} = a_2 + jb_2 \quad (3)$$

then it can be shown with some algebraic manipulation after equating with equation (1) that:

$$R = \frac{\frac{1}{a_2} - \frac{1}{a_1}\left(\frac{\omega_1}{\omega_2}\right)^2}{1 - \left(\frac{\omega_1}{\omega_2}\right)^2}. \quad (4)$$

Expressions for $C_L$ and $C_F$ can also be written out. The formation resistance can be accurately obtained. If it is desired to determine the measurement current $I_F$, the leakage current can be calculated:

$$I_L = \frac{V}{Z_L} = j\omega C_L V \quad (5)$$

and subtracted from the total current. In this manner the phase and amplitude of the measurement current are obtained. For more sophisticated equivalent circuit models having more unknowns, measurements at additional frequencies can be used to calculate the formation resistivity and any other unknowns of interest. More sophisticated equivalent circuit models often have better accuracy in describing the physical problem.

Figure 9:
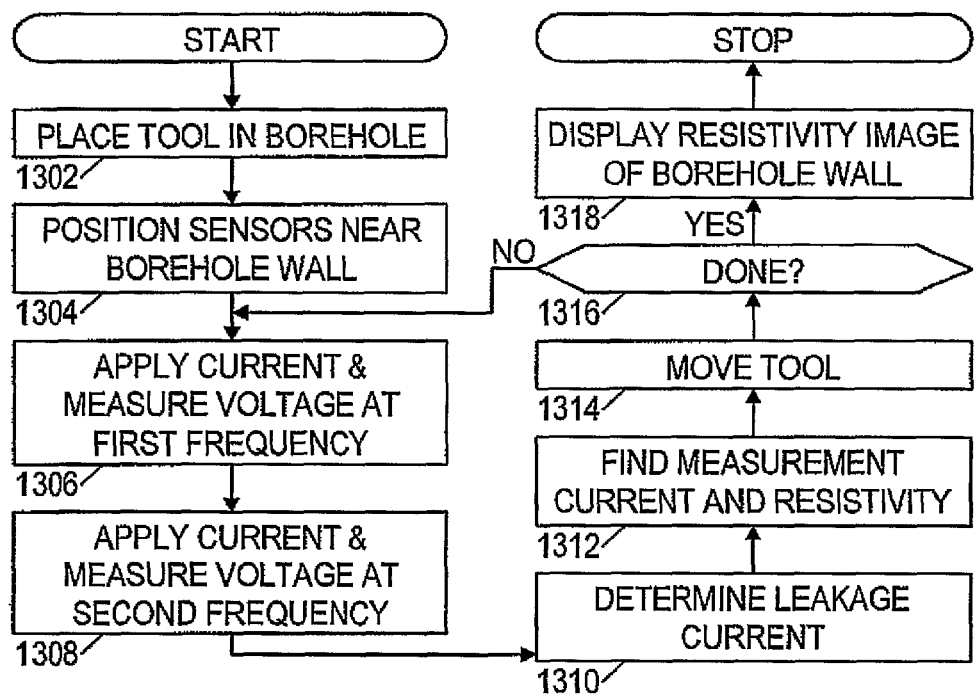
FIG. 9 shows a flow diagram of an illustrative imaging method with leakage current compensation.

FIG. 9 shows a flow diagram of a resistivity imaging method. In block 1302, the resistivity imaging tool is placed in a borehole. For LWD, the tool is part of the bottom hole assembly and is used to perform logging as drilling operations are performed. For wireline logging, the tool is part of a sonde that is lowered to the bottom of the region of interest to perform logging as the logging tool is pulled uphole at a steady rate.

In block 1304, the tool is placed in logging mode. For LWD, this operation may (or may not) involve deploying a decentralizer that forces sensors in the tool body against the borehole wall. Alternatively, the LWD resistivity imaging tool may have one or more sensor pads that are deployed against the borehole wall. For wireline logging, multiple sensor pads are deployed against the borehole wall.

Blocks 1306-1316 represent operations that occur during the logging process. Though shown and described in a sequential fashion, the various operations may occur concurrently, and moreover, they may simultaneously occur for multiple voltage electrode pairs and multiple sensor pads. In block 1306, the source driving the current electrodes begins operating at a first frequency, and a first differential voltage measurement is made between the voltage electrodes. In block 1308, the source driving the current electrodes operates at a second frequency and a second differential voltage measurement is made between the voltage electrodes. In other embodiments, the current signal provides power at multiple frequencies simultaneously, which can be done with a sum of sinusoidal signal of different frequencies (i.e., a combination of narrowband signals), or with a wideband signal such as white noise or a signal that resembles an impulse in the time domain. As the tool energizes the formation via the current electrodes, the tool measures the amplitude and relative phase of the differential voltages between the various voltage electrode pairs. For the simultaneous multi-frequency embodiments, the differential voltage measurements may be filtered or transformed to obtain the amplitude and phase response for each frequency.

From the current and differential voltage measurements, the total impedance at each frequency is determined in block 1310 and may be used to determine a leakage current and/or to directly determine a formation resistivity. If the formation resistivity is not directly determined in block 1310, then in block 1312, a measurement current and formation resistivity may be determined based in part on the leakage current. Also in block 1312, the tool, or more likely, the surface logging facility coupled to the tool, associates the compensated resistivity measurements with a tool position and orientation measurement, thereby enabling a determination of borehole wall image pixel values.

In block 1314, the tool moves along the borehole, and in block 1316, a check is performed to determine whether logging operations should continue (e.g., whether the logging tool has reached the end of the region of interest). For continued logging operations, blocks 1306-1316 are repeated. Once logging operations are complete, the surface logging facility maps the resistivity measurements into borehole wall image pixels and displays a resistivity image of the borehole wall in block 1318. Alternatively, the resistivity image may be displayed as it is being created during logging operations.

A variety of voltage electrode geometries are possible and may be used. A greater number of voltage electrodes may provide higher resolution at the expense of increased processing costs. The operating voltages and currents may vary widely while remaining suitable for the logging operations described herein. It has been found that source current frequencies above about 5 kHz, and perhaps as high as 100 kHz or more, are desirable as they reduce the mud layer impedances and increase the voltage differences measurable between the voltage electrodes. Higher frequencies generally provide larger measurement signals, but they also increase leakage currents, making the compensation methods disclosed herein even more desirable. In some tool embodiments, the source current frequency may be switchable between low frequency regions (e.g., around 10 kHz) and high frequency regions (e.g., around 80 kHz) for measurements in formations of differing resistivity. Higher frequencies may be preferred for formations having a generally lower resistivity, and vice versa.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, often serves as a functional equivalent to resistivity. Accordingly, the scope of protection is not limited to the embodiments described herein, but is only limited by the claims which follow, the scope of which shall include all equivalents of the subject matter of the claims.

What is claimed is:

1. A logging method that comprises:
   generating an electric field with a first frequency using at least two current electrodes on a sensor array proximate to a borehole wall;
   measuring a first differential voltage with at least two voltage electrodes positioned between the current electrodes;
   generating an electric field with a second frequency using said current electrodes;
   measuring a second differential voltage with said voltage electrodes; and
   determining a formation property that is compensated for current through a leakage path, wherein said determining employs an equivalent circuit model that represents the formation between the voltage electrodes as a capacitor in series with a resistor.

2. The logging method of claim 1, wherein said determining includes solving a set of simultaneous equations for the equivalent circuit model, wherein the equivalent circuit model represents the leakage path as a capacitance between the current electrodes.

3. The logging method of claim 2, wherein said measuring of the first and second differential voltages includes measuring voltage amplitude and phase.

4. The logging method of claim 2, further comprising:
   generating an electric field with a third frequency using said current electrodes; and
   measuring a third differential voltage with said voltage electrodes.

5. The logging method of claim 1, wherein current from the current electrodes through the leakage path is mitigated by a respective guard electrode for each current electrode.

6. The logging method of claim 1, wherein the electric field simultaneously has energy at both the first and second frequencies.

7. The logging method of claim 6, wherein said measuring the first and second differential voltages includes processing a differential signal measurement to determine a response amplitude and phase at each of the first and second frequencies.

8. The logging method of claim 1, further comprising:
   measuring a tool position and orientation;
   using the tool position and orientation measurements to associate the formation resistivity determinations with positions on a wall of the borehole.

9. The logging method of claim 7, further comprising displaying a resistivity image derived from the tool position and orientation measurements and the formation resistivity determinations.

10. A logging tool that comprises:
    a sensor array having at least two voltage electrodes positioned between at least two current electrodes, wherein the at least two current electrodes are energized to create an oscillatory electric field with at least one of two or more frequencies in a formation forming a borehole wall;
    a voltage detector coupled to the at least two voltage electrodes to measure a differential voltage phase and magnitude induced by the electric field at each of the two or more frequencies;
    a processor in communication with the voltage detector and to the at least one current sensor to determine a measurement indicative of a formation property based on the differential voltage phase and magnitude measurements at each of the two or more frequencies, wherein the determination employs a representation of the formation as a capacitance in series with a resistance between the voltage electrodes.

11. The logging tool of claim 10, wherein to determine said measurement, the processor solves a set of simultaneous equations for an equivalent circuit model having a capacitance representing the leakage path.

12. The logging tool of claim 11, wherein the oscillatory electric field cycles sequentially through at least three different frequencies, and wherein the voltage detector determines a differential voltage phase and magnitude at each frequency.

13. The logging tool of claim 10, further comprising for each current electrode a respective guard electrode that is maintained at a potential substantially equal to that of the current electrode.

14. The logging tool of claim 10, wherein the electric field simultaneously oscillates at both the first and second frequencies.

15. The logging tool of claim 14, wherein said processor processes a signal from the voltage detector to determine a response amplitude and phase at each of the first and second frequencies.

16. The logging tool of claim 10, wherein the processor measures a tool position and orientation to associate formation property measurements with positions on a borehole wall.

17. A logging method that comprises:
   generating an electric field with a first frequency and a second frequency using at least two current electrodes on a sensor array proximate to a borehole wall;
   measuring a differential voltage with at least two voltage electrodes positioned between the current electrodes;
   processing the differential voltage to determine a first impedance at the first frequency and a second impedance at the second frequency, said impedances being expressible as:

$$\frac{1}{Z_T(\omega_1)} = a_1 + jb_1, \text{ and } \frac{1}{Z_T(\omega_2)} = a_2 + jb_2; \text{ and}$$

determining a formation property $$R = \frac{\frac{1}{a_2} - \frac{1}{a_1}\left(\frac{\omega_1}{\omega_2}\right)^2}{1 - \left(\frac{\omega_1}{\omega_2}\right)^2}$$

18. The logging method of claim 17, further comprising:
   measuring a tool position and orientation;
   using the tool position and orientation measurements to associate the formation resistivity determinations with positions on a wall of the borehole; and
   displaying a resistivity image derived from the tool position and orientation measurements and the formation resistivity determinations.

\* \* \* \* \*